United States Patent
Creusot et al.

(10) Patent No.: US 12,246,459 B2
(45) Date of Patent: Mar. 11, 2025

(54) SYSTEM AND/OR METHOD OF COOPERATIVE DYNAMIC INSERTION SCHEDULING OF INDEPENDENT AGENTS

(71) Applicant: Chef Robotics, Inc., San Francisco, CA (US)

(72) Inventors: Clement Creusot, San Francisco, CA (US); Rajat Bhageria, San Francisco, CA (US); Norberto Goussies, San Francisco, CA (US); Luis Rayas, San Francisco, CA (US); Xiaoyi Chen, San Francisco, CA (US)

(73) Assignee: Chef Robotics, Inc., San Francisco, CA (US)

( * ) Notice: Subject to any disclaimer, the term of this patent is extended or adjusted under 35 U.S.C. 154(b) by 230 days.

(21) Appl. No.: 18/075,961

(22) Filed: Dec. 6, 2022

(65) Prior Publication Data
US 2023/0191615 A1 Jun. 22, 2023

Related U.S. Application Data

(60) Provisional application No. 63/296,245, filed on Jan. 4, 2022, provisional application No. 63/291,067, filed on Dec. 17, 2021.

(51) Int. Cl.
*B25J 11/00* (2006.01)
*B25J 9/00* (2006.01)
(Continued)

(52) U.S. Cl.
CPC ........... *B25J 9/1697* (2013.01); *B25J 9/0093* (2013.01); *B25J 9/1687* (2013.01);
(Continued)

(58) Field of Classification Search
CPC ...... B25J 9/1697; B25J 9/0093; B25J 9/1687; B25J 11/0045; B25J 13/08; B25J 9/1679;
(Continued)

(56) References Cited

U.S. PATENT DOCUMENTS

| | | | |
|---|---|---|---|
| 2011/0166703 A1 | 7/2011 | Byrne | |
| 2017/0290345 A1* | 10/2017 | Garden | A21C 9/08 |
| 2019/0291277 A1* | 9/2019 | Oleynik | B25J 9/1669 |
| 2020/0054175 A1* | 2/2020 | Roy | B25J 21/00 |

(Continued)

OTHER PUBLICATIONS

Goussies, Norberto A., et al., "System and/or Method for Conveyor Motions Estimation", U.S. Appl. No. 18/499,092, filed Oct. 31, 2023.

*Primary Examiner* — Adam R Mott
*Assistant Examiner* — Heather J Keniry
(74) *Attorney, Agent, or Firm* — Jeffrey Schox; Evan Myers

(57) ABSTRACT

A method can include: receiving imaging data; identifying containers using an object detector; scheduling insertion based on the identified containers; and optionally performing an action based on a scheduled insertion. However, the method can additionally or alternatively include any other suitable elements. The method functions to schedule insertion for a robotic system (e.g., ingredient insertion of a robotic foodstuff assembly module). Additionally or alternatively, the method can function to facilitate execution of a dynamic insertion strategy; and/or facilitate independent operation of a plurality of robotic assembly modules along a conveyor line.

20 Claims, 9 Drawing Sheets

(51) Int. Cl.
  *B25J 9/16* (2006.01)
  *B25J 13/08* (2006.01)
  *G05B 19/418* (2006.01)
  *G06T 7/20* (2017.01)
  *G06T 7/246* (2017.01)
  *G06T 7/70* (2017.01)
  *G06V 10/764* (2022.01)
  *G06V 20/68* (2022.01)

(52) U.S. Cl.
  CPC ........... *B25J 11/0045* (2013.01); *B25J 13/08* (2013.01); *G06T 7/20* (2013.01); *G06T 7/70* (2017.01); *G06V 10/764* (2022.01); *G06V 20/68* (2022.01); *G06T 2207/30128* (2013.01); *G06T 2207/30241* (2013.01)

(58) Field of Classification Search
  CPC ... G06T 7/20; G06T 7/70; G06T 2207/30128; G06T 2207/30241; G06T 7/246; G06T 2207/20084; G06V 10/764; G06V 20/68; G05B 2219/40607; G05B 19/4182
  See application file for complete search history.

(56) References Cited

U.S. PATENT DOCUMENTS

| | | | |
|---|---|---|---|
| 2020/0082522 A1* | 3/2020 | Bonneau | G06V 10/764 |
| 2020/0090099 A1* | 3/2020 | Johnson | B25J 9/1653 |
| 2020/0394603 A1* | 12/2020 | Ottitsch | G06Q 30/0185 |
| 2022/0048707 A1* | 2/2022 | Matl | B65G 1/1373 |
| 2022/0348409 A1* | 11/2022 | Sun | B07C 5/36 |
| 2023/0039524 A1* | 2/2023 | Bhageria | B25J 9/161 |

* cited by examiner

SYSTEM AND/OR METHOD OF COOPERATIVE DYNAMIC INSERTION SCHEDULING OF INDEPENDENT AGENTS

CROSS REFERENCE TO RELATED APPLICATIONS

This application claims the benefit of U.S. Provisional Application No. 63/296,245, filed 4 Jan. 2022, and U.S. Provisional Application No. 63/291,067, filed 17 Dec. 2021, each of which is incorporated herein in its entirety by this reference.

TECHNICAL FIELD

This invention relates generally to the robotic automation field, and more specifically to a new and useful dynamic insert scheduling system and/or method in the robotic automation field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
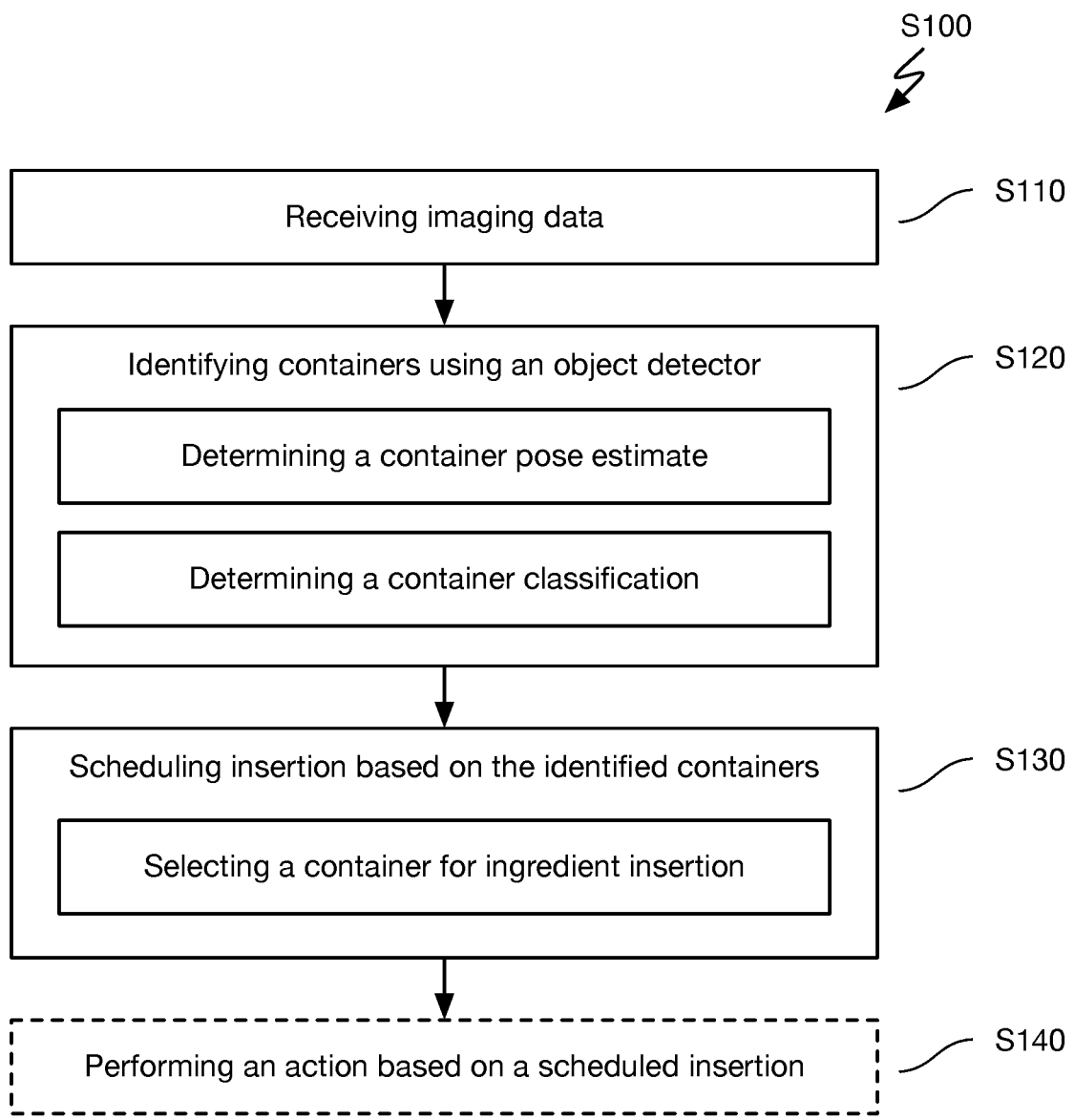
FIG. 1 is a flowchart diagrammatic representation of a variant of the method.

The method S100, an example of which is shown in FIG. 1, can include: receiving imaging data S110; identifying containers using an object detector S120; scheduling insertion based on the identified containers S130; and optionally performing an action based on a scheduled insertion S140. However, the method S100 can additionally or alternatively include any other suitable elements. The method functions to schedule insertion for a robotic system (e.g., ingredient insertion of a robotic foodstuff assembly module). Additionally or alternatively, the method can function to facilitate execution of a dynamic insertion strategy; and/or facilitate independent operation of a plurality of robotic assembly modules along a conveyor line.

Figure 2:
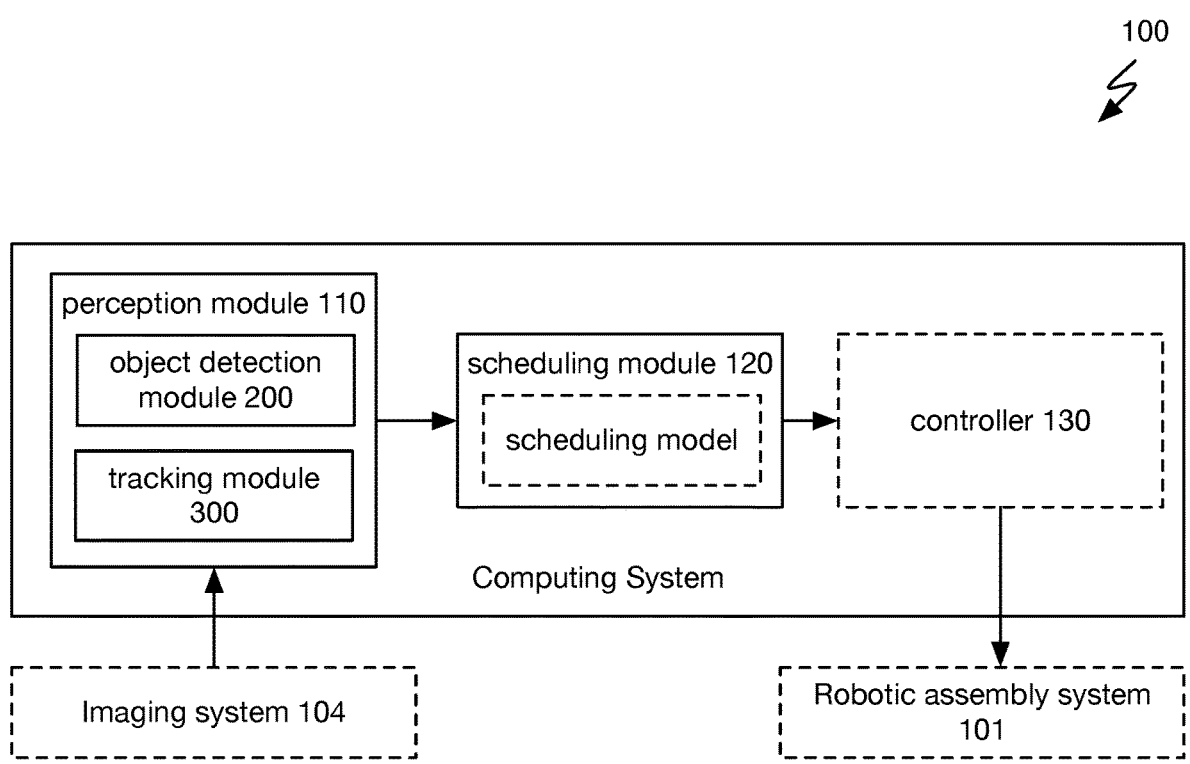
FIG. 2 is a schematic representation of a variant of the system.

The system 100, an example of which is shown in FIG. 2, can include: a perception module 110, a scheduling module 120, an optional controller 130 and/or any other suitable elements. The system can optionally include or be used with an imaging system 104. However, the system 100 can additionally or alternatively include any other suitable set of components. The system functions to determine insert targets for insertion by a robotic system 101 (e.g., according to an ingredient configuration). Additionally or alternatively, the system can function to take the place of a human worker on an assembly line (e.g., food container assembly line); facilitate execution of a (dynamic) insertion strategy; and/or facilitate execution of method S100.

The system can optionally include or be used with a robotic assembly system 101, such as a robotic pick and place system, gantry-style dispensing system, multi-axis robotic arm, and/or other robotic assembly system. In variants, the system can include or be used in conjunction with the modular system(s) and/or method(s) as described in U.S. application Ser. No. 17/881,475, titled "SYSTEM AND/OR METHOD FOR ROBOTIC FOODSTUFF ASSEMBLY," filed 4 Aug. 2022, which is incorporated herein in its entirety by this reference.

The system can optionally include or be used in conjunction with an industrial conveyor line 102 or deployed in a high-throughput assembly application (e.g., airline food catering prep, etc.; continuously moving line; where a container throughput rate exceeds an insertion throughput rate of a robotic assembly module by a factor of: 1.5, 2, 3, 4, greater than 4, any range bounded by the aforementioned values, and/or any other suitable line speed, etc.), such as in place of a human line worker. In a specific example, the system and/or workspace thereof can be downstream of a human assembly workspace along the conveyor line. In a second example, a cyclic insertion of the foodstuff ingredient by the system and/or method can define an (ingredient) insertion rate, wherein a container throughput rate of the conveyor line is greater than the insertion rate (e.g., between 100% and 200% of the insertion rate, exactly 200% of the insertion rate, greater than 200% of the insertion rate, etc.). However, the system can alternatively be deployed in any suitable robotic assembly settings.

Figure 5:
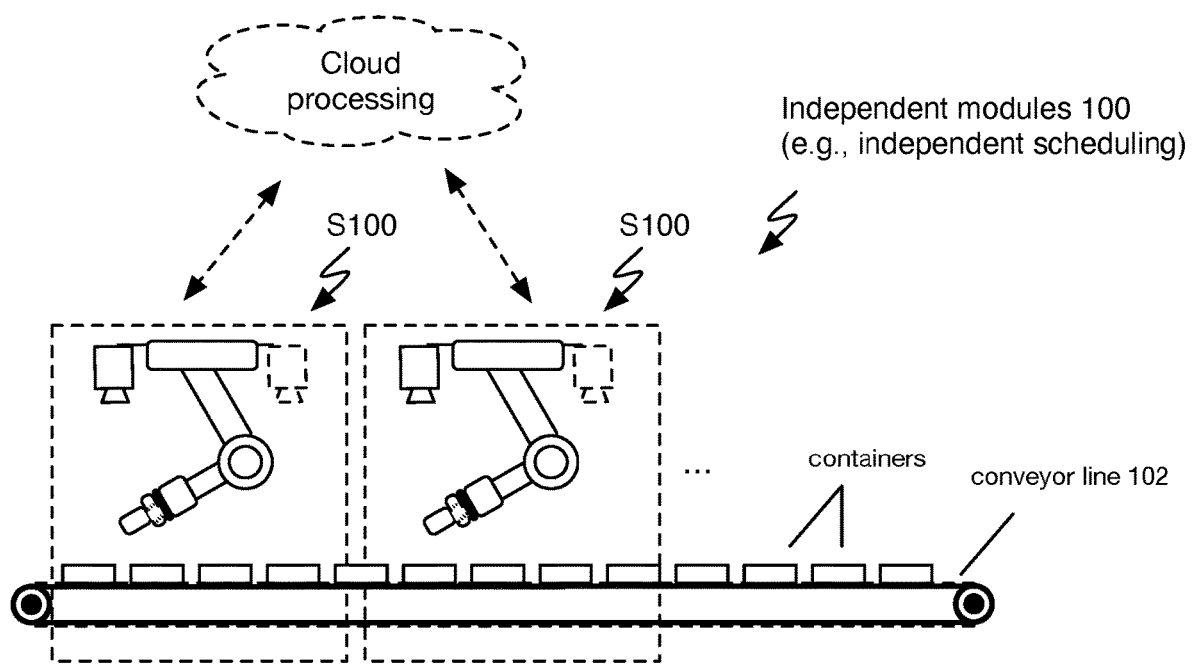
FIG. 5 is an example arrangement of multiple system modules independently operating according to one or more variants of the method.

In variants, multiple independent (e.g., modular) instances of the system and/or method can cooperatively operate and/or coordinate without requiring cross communication (e.g., between modules), cross calibration, and/or centralized control (e.g., at a central compute node coordinating between modules), an example of which is shown in FIG. 5. In a specific example, a plurality of robotic assembly modules arranged along a single conveyor line may operate in absence of communication with each other and/or a central controller during planning and/or ingredient insertion (e.g., during an insertion interval). In a second example, each robotic assembly module can be controlled independently of a conveyor line and/or while communicatively decoupled from the conveyor line. For instance, in absence of communication with a conveyor line controller, the system 100 can detect and/or track containers on the conveyor line and respond accordingly (e.g., dynamically adjusting current/future scheduling, planning, and control based on the motion of the conveyor).

The term "substantially" as utilized herein can mean: exactly, approximately, within a predetermined threshold (e.g., with 5%, 10%, 20%, 50%, etc.), and/or have any other suitable meaning.

2. Benefits.

Variations of the technology can afford several benefits and/or advantages.

First, variants can facilitate dynamic insertion planning/scheduling for robotic assembly modules without a central planning/control node to coordinate between modules. In variants, each module can dynamically schedule insertion operations based on the state of ingredients already inserted within the containers (e.g., the "completeness" of a container). Such variants can be more robust to changes in line speed and operation with flexible labor constraints—such as the addition of human workers (e.g., in conjunction with the robot), robotic assembly modules going offline (e.g., due to an error or power failure), and/or the addition of robotic assembly modules (e.g., independently operating without a central controller; an example is shown in FIG. 5). In particular, variants can allow for the addition of modules (e.g., each providing one or more robotic arms) to scale throughput in various settings while maintaining or decreasing the size of the required workforce, which can be particularly advantageous when labor resources are finite or difficult to scale (e.g., during a labor supply shortage). Further, such variants may avoid introducing a single point of failure, which could result in costly delays and service downtime, particularly in high throughput settings. As an example, a single robotic assembly module and/or insertion planner may be serviced, repaired, and/or replaced without rate-limiting containers or additional assembly modules operating on the same conveyor (e.g., without any modification to the insertion scheduling strategy of each module).

Second, variants of this technology can provide dynamic insertion planning according to a set of goals/heuristics (e.g., a high-level insertion strategy) which may avoid propagation of delays and downstream inefficiencies. As an example, variants can enable higher filling/insertion throughput by allowing robotic assembly modules to skip containers (e.g., by controlling the robots to fill every Nth container; not filling some containers). Instead of pausing each container within the robot's workspace to await a fill, the containers can pass through the robot's workspace (e.g., at speed) while the robot is picking the next set of objects to insert. The robot can then fill an upcoming container (e.g., the Nth container) after object picking. In variants, the system can dynamically infer which containers to 'skip' (e.g., avoid as insertion targets) by optimizing insertion scheduling (e.g., locally, at a control system of the robot) based on the insertion cycle time and container throughput rate to efficiently leverage resources (e.g., available ingredient capacity, ingredient availability, throughput capacity, etc.; along the entire line; downstream resources; etc.) and/or minimize inefficiencies/errors (e.g., such as incomplete containers passing the end of a sequence of robotic modules; adjusting based on upstream errors/inefficiencies; etc.). As an example, a high-level strategy of placing in the furthest-accessible empty (or incomplete) container within a workspace of a robotic assembly module may sometimes result in downstream inefficiencies in a high-throughput setting, such as where downstream resources are underutilized (e.g., during periods of downtime where no empty/incomplete containers are accessible) and/or are unable to complete insertion for each container of a sequence of empty (or incomplete) containers.

Figure 3:
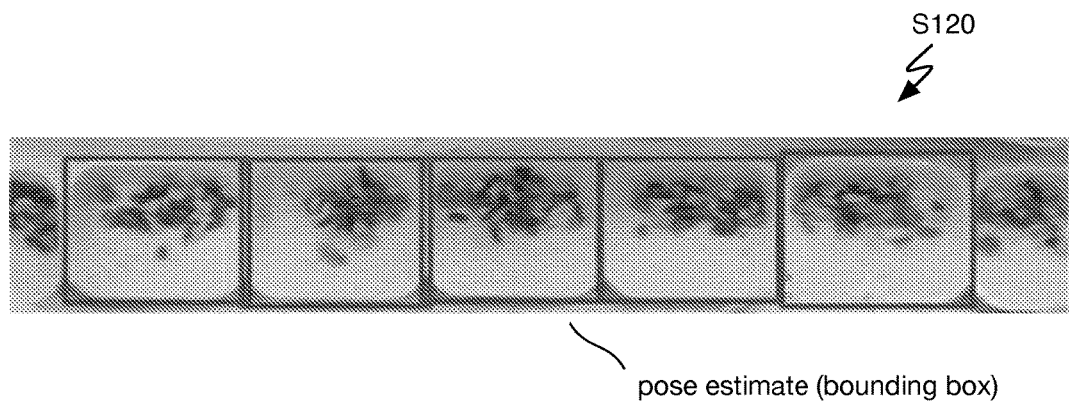
FIG. 3 is an example of container identification along a conveyor in variants of the system and/or method.
Figure 4:
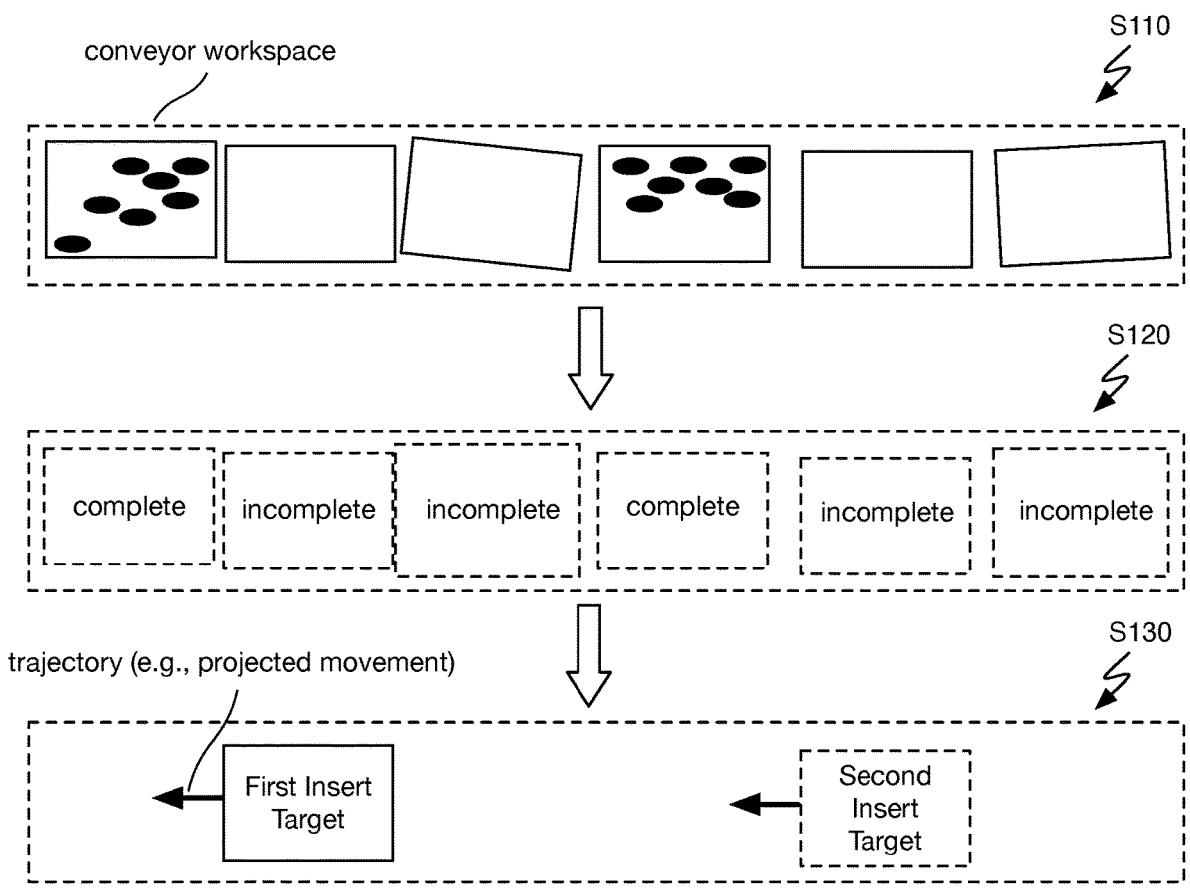
FIG. 4 is an example diagrammatic representation of container identification and scheduling in variants of the system and/or method.

Third, variations of this technology can utilize robust computer vision techniques (e.g., neural networks, YOLO object detectors, etc.) to facilitate container identification and/or classification which can be agnostic to variability in robot arrangement and/or workspace configurations. Variants can be agnostics to a variety of lighting conditions, container geometries (e.g., square bowls, round bowls, oblong bowls, plates, burritos; containers of arbitrary size and shape; etc.), conveyor line configurations (e.g., color, width, height, number of lanes; conveyors with guards for container alignment; indexed conveyors, continuous conveyors, stop-and-go conveyors, etc.), and/or other variability. Variants can additionally facilitate placement in containers with varied orientation/spacing along a conveyor line (e.g., examples are shown in FIGS. 3 and 4). As an example, such variants can allow accurate placement into containers which are automatically placed onto the line (e.g., automatically de-nested or dispensed onto a conveyor line; with predictable variability) and/or bowls which are arranged on a conveyor by a human (e.g., with unpredictable variability; with varying relative pose, spacings, overlaps, etc.).

Fourth, variants of this technology can provide persistent estimates of container poses and/or trajectories, which can enable substantially continuous operation of the robot arm (e.g., without pauses for sensing when the robot arm obstructs various perception sensors) and/or control/trajectory planning when the container is occluded (e.g., by a robotic arm). As an example, such variants can enable accurate and/or aesthetically pleasing placement of ingredients in specific regions (e.g., quadrants) of a container (e.g., according to a predetermined ingredient insertion template, etc.).

Fifth, variations of this technology can enable the use of robotic placement modules which may be electrically and/or communicatively decoupled (e.g., not in communication with) from a conveyor line controller. Such variants can improve the reconfigurability and/or serviceability of modules along a conveyor line and/or may decrease the burden of integrating such systems.

Sixth, variations of this technology can reduce human involvement in food assembly by performing assembly operations with a robotic arm. In variants, the system can additionally enable facile human interactions related to configuring the system (e.g., arrangement of robotic assembly modules along a conveyor line can be arbitrary; ingredient configuration), servicing (e.g., modularity can limit service downtime to a single unit), monitoring (e.g., wireless monitoring and/or software updates), and line change operations which can further reduce the number of humans required for a food assembly, processing, and/or servicing the system.

However, variations of the technology can additionally or alternately provide any other suitable benefits and/or advantages.

3. System.

The system 100, an example of which is shown in FIG. 2, can include: a perception module 110, a scheduling module 120, an optional controller 130 and/or any other suitable elements. The system can optionally include or be used with an imaging system 104. However, the system 100 can additionally or alternatively include any other suitable set of components. The system functions to determine insert targets for insertion by a robotic system 101 (e.g., according to an ingredient configuration). Additionally or alternatively, the system can function to take the place of a human worker on an assembly line (e.g., food container assembly line); facilitate execution of a (dynamic) insertion strategy; and/or facilitate execution of method S100.

The system 100 can optionally include an imaging system 104, which preferably functions to capture images of objects (e.g., food containers) along a conveyor line, but can provide any other functionality(ies). Additionally or alternatively, the imaging system can function to provide imaging data to the object detector in accordance with Block S110 of the method. The imaging system can include: food container cameras (e.g., oriented toward food containers and/or container management system; 2D RGB), stereo camera pairs, CCD cameras, CMOS cameras, time-of-flight sensors (e.g., Lidar scanner, etc.), a range imaging sensors (e.g., stereo triangulation, sheet of light triangulation, structured light scanner, time-of-flight, interferometry, etc.), and/or any other suitable sensors. The sensors can be arranged into sensor sets and/or not arranged in sets. The imaging system can determine one or more RGB images (e.g., 2D), depth images (e.g., pixel aligned with the RGB, wherein the RGB image and the depth image can be captured by the same or different sensor sets). Imaging sensors are preferably calibrated within a common coordinate frame (i.e., sensor coordinate frame calibrated to a relative arrangement of the conveyor line and the robotic assembly module) in a fixed/predetermined arrangement relative to a (joint) coordinate frame of a robot assembly module, but can be otherwise suitably configured.

In a specific example, the system can include or be used in conjunction with the foodstuff assembly system and/or imaging sensors as described in U.S. application Ser. No. 17/881,475, titled "SYSTEM AND/OR METHOD FOR ROBOTIC FOODSTUFF ASSEMBLY," filed 4 Aug. 2022, which is incorporated herein in its entirety by this reference.

However, the system can alternatively include or be used in conjunction with any other suitable imaging system(s); or the system can altogether exclude an imaging system.

The perception module 110 functions to identify, classify, and/or track objects (e.g., containers) along the conveyor and/or within a robot workspace. The perception module 110 can include a detection module 200, a tracking module 300, and/or any other suitable elements.

The detection module 200 can include an object detector, which functions to identify objects and/or generate object state estimates based on a set of input imaging data. Additionally or alternatively, the object detector can function to perform Block S120 of the method. The object detector can determine: unique object instances of one or more object types (e.g., assigning an instance ID; for each container instance), object parameters for each identified object (e.g., a pose estimate, occlusion parameter, principal axis, bounding box, etc.), a classification probability for each identified object (e.g., binary classification, multi-class classification, etc.), and/or any other suitable information. In a specific example, the object detector can output a plurality of object estimates for an individual image frame, wherein the object estimates include an object instance identifier, a classification probability (e.g., a binary classification: complete or incomplete; a multiclass classification: "empty", "rice", "rice"+"carrots", "rice"+"beef"+"carrots", etc.), and a pose estimate (e.g., 2D pose estimate, 3D pose estimate, etc.; bounding box, corner points, principal axis, etc.). However, the object detector can be configured to generate any other suitable object estimates.

Figure 6:
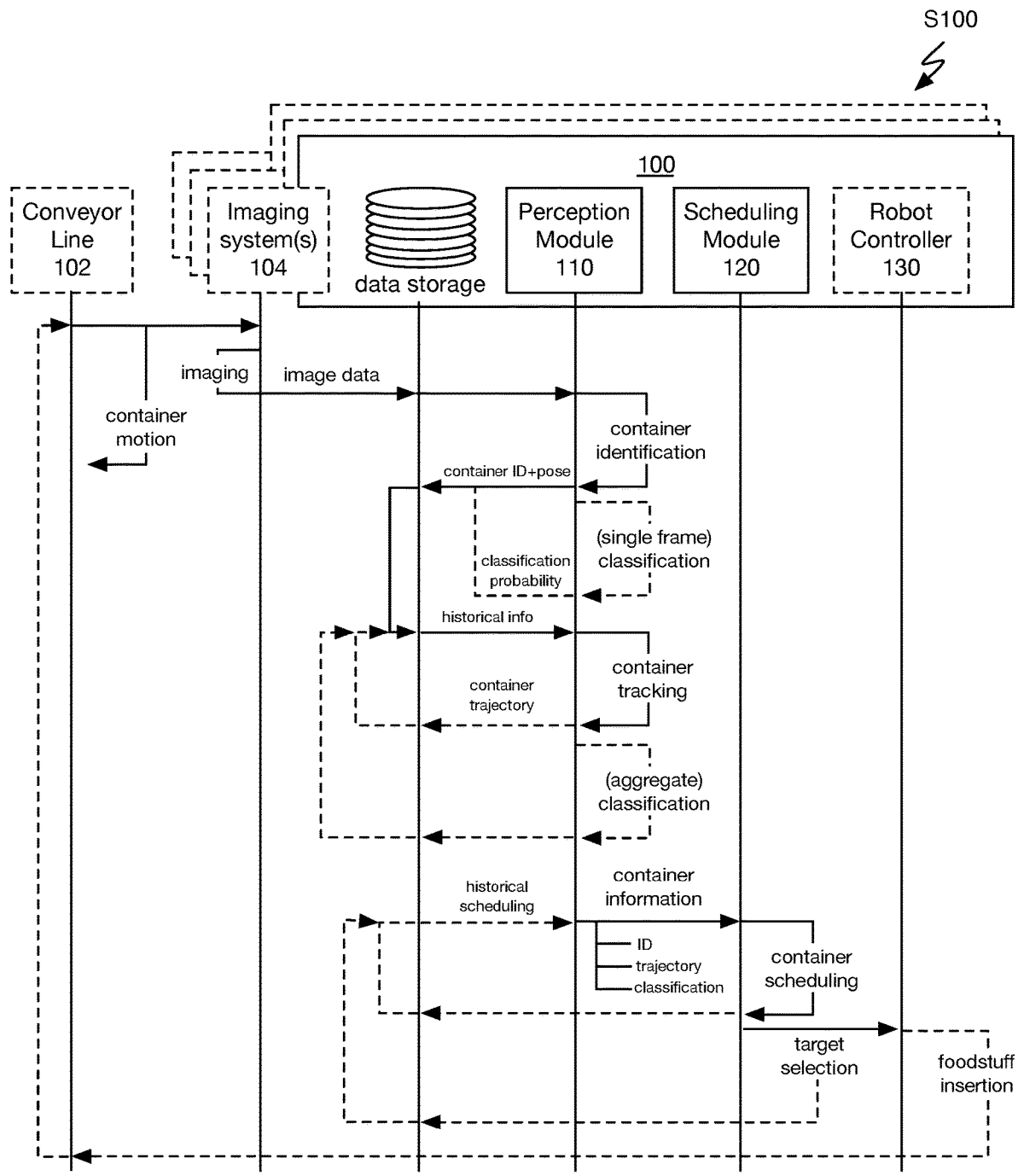
FIG. 6 is an example flowchart diagrammatic representation of a variant of the system and/or method.

The object detector preferably receives a single image frame spanning a conveyor region within a workspace of a robotic assembly module as an input, but can additionally or alternatively operate over a plurality of image frames (e.g., generating an aggregate classification; an example is shown in FIG. 6), depth imaging data, perspective images, and/or any other suitable inputs. In some variants, the conveyor space can be a tightly controlled environment (e.g., clean and/or uniform background).

The object detector is preferably trained with supervised learning, but can alternatively be trained using a semi-supervised and/or unsupervised learning approach (e.g., relying on a generic object detector and/or more computationally expensive object detector such as a 3D object detector, etc.). Additionally or alternatively, the object detector can optionally be retrained and/or updated based on a subsequent validation of the identification/classification results (e.g., evaluation of containers at the end of the line, etc.). The object detector can be retrained and/or updated: never, periodically, aperiodically, based on a satisfaction of a trigger condition (e.g., temporal trigger; in response to a detection and/or classification accuracy falling below a predetermined threshold; in response to change in a conveyor line or container appearance, etc.), and/or with any other suitable frequency.

The object detector can be a generative model, a discriminative model, and/or any other suitable object detector. The object detector can include one or more: neural network (e.g., CNN, R-CNN, FCN, YOLO, etc.), graphical model (e.g., Bayesian network), a logistic regression, clustering algorithms, feature detectors (e.g., ORB, SIFT, etc.), histogram of gradients (HOG), single shot detector (SSD), spatial pyramid pooling (SPP-net), and/or any other suitable feature detector(s). In variants, the object detector can include a classifier (e.g., binary classifier, multiclass classifier, etc.) and/or can function classify detected objects. The object detector can include: an integrated object detector/classifier, a binary classifier, a multi-class classifier, a clustering model (e.g., hierarchical clustering model), a regression model, a neural network model (e.g., DNN, CNN, RNN, etc.), a cascade of neural networks, an ensemble of neural networks, compositional networks, Bayesian networks, Markov chains, predetermined rules, probability distributions, heuristics, probabilistic graphical models, and/or other model(s). However the object detector can include any other suitable model(s).

Additionally, in variants the detection module can optionally receive a machine configuration of the system (e.g., type of ingredient that the robotic assembly module is inserting, such as: "rice", "carrots", etc.), which function to specify the difference between filled and unfilled containers, and/or the ingredient the machine is currently configured to insert. As an example, a machine configuration can serve as an input in variants where the object detector is co-trained to classify different types of objects (e.g., containers with subsets of ingredients of multiple/distinct recipes; containers with multiple subsets of ingredients for the same recipe; etc.). The machine configuration is preferably a target insertion ingredient, however the machine configuration can additionally or alternatively include or be associated with: a target object class of a container (e.g., a target visual appearance of a 'filled' container) and/or a target change in visual appearance of a container (e.g., delta between 'unfilled' container and 'filled' container). In a first example, the machine configuration can be manually provided by an operator during a line change and/or servicing operation. In a second example, the machine configuration can be automatically selected from a predefined set based on an automated analysis of a picking bin (e.g., hotel pan of ingredients for insertion). In a third example, a machine configuration can be automatically determined during an initialization routine or received from a central system. Additionally or alternatively, the object detector can be trained for a specific ingredient and/or specific recipe (e.g., without receiving a machine configuration).

In variants, the object detector can be specific to a machine configuration, such as wherein an object detector can be trained for (and/or specified by) a particular machine configuration and/or subset of parameters thereof (e.g., bowl shape, target ingredient, recipe, etc.). Alternatively, the object detector can be specified by the machine configuration and/or can be otherwise configured.

However, the object detector can be configured to operate based on any other suitable set of inputs.

The object detector can be a generative model, a discriminative model, and/or any other suitable object detector. The object detector can include one or more: a neural network (e.g., CNN, R-CNN, FCN, YOLO, etc.) and/or any other suitable feature detector(s). In variants, the object detector can include a classifier (e.g., binary classifier, multiclass classifier, etc.) and/or can function classify detected objects. However, the object detector can include any other suitable models.

The object detector is preferably pretrained using a set of labeled training images, wherein containers in each training image are labeled with a pose (e.g., bounding box, corner points, characteristic axis, etc.) and a corresponding classification (e.g., semantic classification, object classification, etc.). The object detector can be trained with images associated a particular container and/or conveyor appearance in single machine configuration (e.g., single ingredient placement, such as rice); or can be co-trained for a plurality of machine configurations (e.g., can be configured for multiple ingredients and/or recipes). However, the object detector can be otherwise suitably trained and/or updated.

In a first example, the object detector is pretrained to determine the container classification for particular machine configuration and/or a foodstuff ingredient thereof. In a second example, non-exclusive with the first, the object detector includes a joint detection-classification-model which is pre-trained using images of a particular foodstuff ingredient. In in a third example, non-exclusive with the first or second, the object detector is pretrained based on an assembly context associated with a foodstuff container appearance.

However, the system can include any other suitable object detector and/or detection module.

The perception module 110 can include a tracking module 300, which functions to determine object trajectories from objects identified by the object detector. Additionally or alternatively, the tracking module can optionally function to extract auxiliary features based on the container trajectories. Additionally or alternatively, the tracking module can function to determine container trajectories and/or auxiliary features in accordance with a subset of Block S130 of the method.

The tracking module aggregates object estimates across a plurality of historical frames to generate object information (e.g., mapping the plurality of estimates to a corresponding object trajectory; tracking a container through time and/or across multiple image frames). The object information can include: an object identifier (e.g., which can same as the instance identifier; locally unique relative to the current object tracks relevant to a current frame; globally unique; etc.), a classification (e.g., semantic classification; a probability; aggregate classification derived from the classification probabilities associated with each historical object estimate corresponding to the object track, etc.), a trajectory (e.g., historical and/or future predicted motion; time-correlated), and/or any other suitable parameters.

In variants, the object information can include an object (container) classification. The classification can be a semantic classification, an index corresponding to an ingredient state of the container (e.g., complete/incomplete; set of ingredients within a container, etc.), and/or any other suitable classification. The classification can optionally include a probability (e.g., such as an aggregate probability determined from the constituent object states of the object information, etc.) or can otherwise exclude a probability. The classification can be determined based on a single classification probability (e.g., classification probability of current object estimate; for a newly detected object, etc.) or can be an aggregate classification determined based on a plurality of historical object estimates (e.g., according to a set of rules, heuristics, decision trees, etc.; with a corresponding aggregate classification probability).

In variants, the tracking module can optionally predict a future motion and/or pose of each object (container) based on the historical pose estimates (of current and/or prior frames). In a first variant, the tracking module can estimate a line velocity based on the historical rate of change of object poses (e.g., for an individual object track; across all object tracks), where the line velocity is used to generate predicted future states for each object trajectory within the current frame. In a second variant, each movement trajectory can be analyzed to independently generate trajectory predictions for each container. In a third variant, the line speed/velocity can be used to predict future object states for each object trajectory, where the line speed/velocity can be predetermined, received as an input parameter by the tracking module (e.g., from a conveyor belt control system), provided via a machine configuration (e.g., included in an object estimate), dynamically estimated, accessed from data storage/memory, and/or otherwise determined.

As an example: an object estimate corresponding to an object pose proximal to a predicted object pose (e.g., within a threshold deviation, nearest adjacent, etc.) of an existing/prior object trajectory (e.g., from a prior frame, accessed from data storage, etc.) can be updated based on the object estimate associated with a current frame.

The tracking module preferably generates and/or updates a set of object trajectories (e.g., within a memory or other data storage) periodically and/or in response to receiving an updated object estimate from the object detector (e.g., at the end of an update interval, etc.). In an example, wherein the set of image data comprises a plurality of historical image frames, wherein S100 further comprises, based on the plurality of historical frames: tracking a trajectory of the identified containers (e.g., with a tracking module); and estimating a speed of the conveyor (e.g., based on the trajectory, independently of the trajectory, etc.), wherein the insertion target can dynamically selected based on the speed of the conveyor and the trajectory(ies) of the identified container(s).

However, the object trajectories can alternatively be updated only upon the receipt of an object estimate associated with an occlusion parameter below a predetermined threshold (i.e., the object information/trajectory may not be modified/updated when the object is occluded). However, the tracking module can utilize any other tracking techniques and/or algorithms.

In variants, tracking and/or trajectory estimation can enable containers to be selected for insertion in cases where the container may be (partially/fully) occluded in a current and/or historical image frame(s), since the trajectory and/or state estimate for the container can be persistently estimated (e.g., with discontinuous observability among image data). As an example, inserting foodstuff into containers may result in periodic/partial occlusion of the scene, with negligible impact to scheduling via S130.

However, the system can include any other suitable tracking module.

Figure 8:
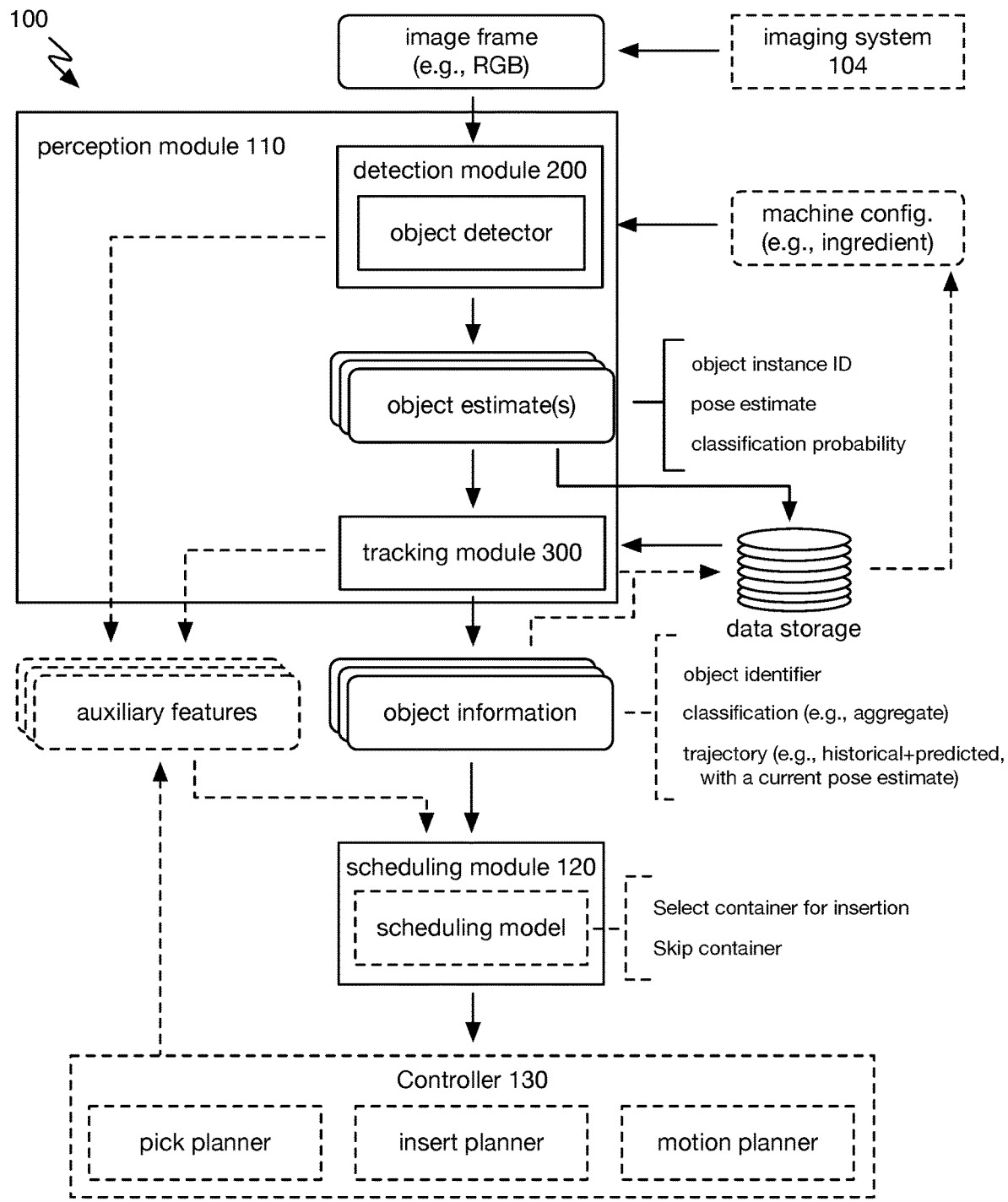
FIG. 8 is a schematic representation of a variant of the system.

The system 100 can include a scheduling module 120 which functions to select containers for insertion based on the container trajectories (e.g., which can be used by the controller for insert planning and control). The scheduling module (e.g., scheduling model therein, an example is shown in FIG. 8) receives the object trajectories (e.g., including a pose/trajectory and a classification) and auxiliary features (e.g., robot cycle time, line speed/velocity, average container spacing, etc.) and selects containers for insertion. As an example, the scheduling module can provide the object trajectories received from the tracking module to a controller (e.g., for insertion/motion planning), while masking/filtering out any objects and/or trajectories to be skipped (i.e., only providing the targets). The outputs of the scheduling module can be ordered/sequential or unordered (e.g., where a controller may infer an insertion order based on a direction of motion of the line; where only a single trajectory is provided to the controller at any given time, etc.).

In variants, the scheduling module can include a scheduling model (e.g., a binary classifier) which functions to classify if a container should be selected for ingredient insertion or skipped. The scheduling model is preferably a heuristic classifier which dynamically selects containers for insertion according to a predetermined set of rules (e.g., manually engineered/derived according to a predetermined high-level strategy or a set of goals; learned; etc.) and/or criterion. The scheduling model can additionally or alternatively be employed via ensemble and/or cascading techniques. Containers (and/or an object information/trajectory associated therewith) can additionally or alternatively be selected using: decision trees, neural networks, graphical models, logistic regression models, clustering algorithms, classifiers, and/or any other suitable algorithm(s), model(s) or techniques.

In a specific example, the scheduling module and/or scheduling model thereof can select containers for ingredient insertion in accordance with method S100 and/or Block S130 thereof.

In variants, the scheduling module can be configured to select containers for ingredient insertion based on the classification probabilities of identified containers (e.g., from a pretrained object detector and/or classifier).

In variants, the scheduling module can operate according to a predetermined insertion strategy. In a first example, the scheduling module can select alternating containers which satisfy a predetermined classification probability for ingredient insertion. In a second example, the predetermined insertion strategy can be based on a conveyor line speed. In a third example, wherein each foodstuff assembly system defines an ingredient insertion rate, wherein a container throughput rate of the conveyor line is greater than the ingredient insertion rate. In a fourth example, the predetermined insertion strategy can be based on a resource availability of the foodstuff ingredient.

However, the system can include any other suitable scheduling module.

Figure 9:
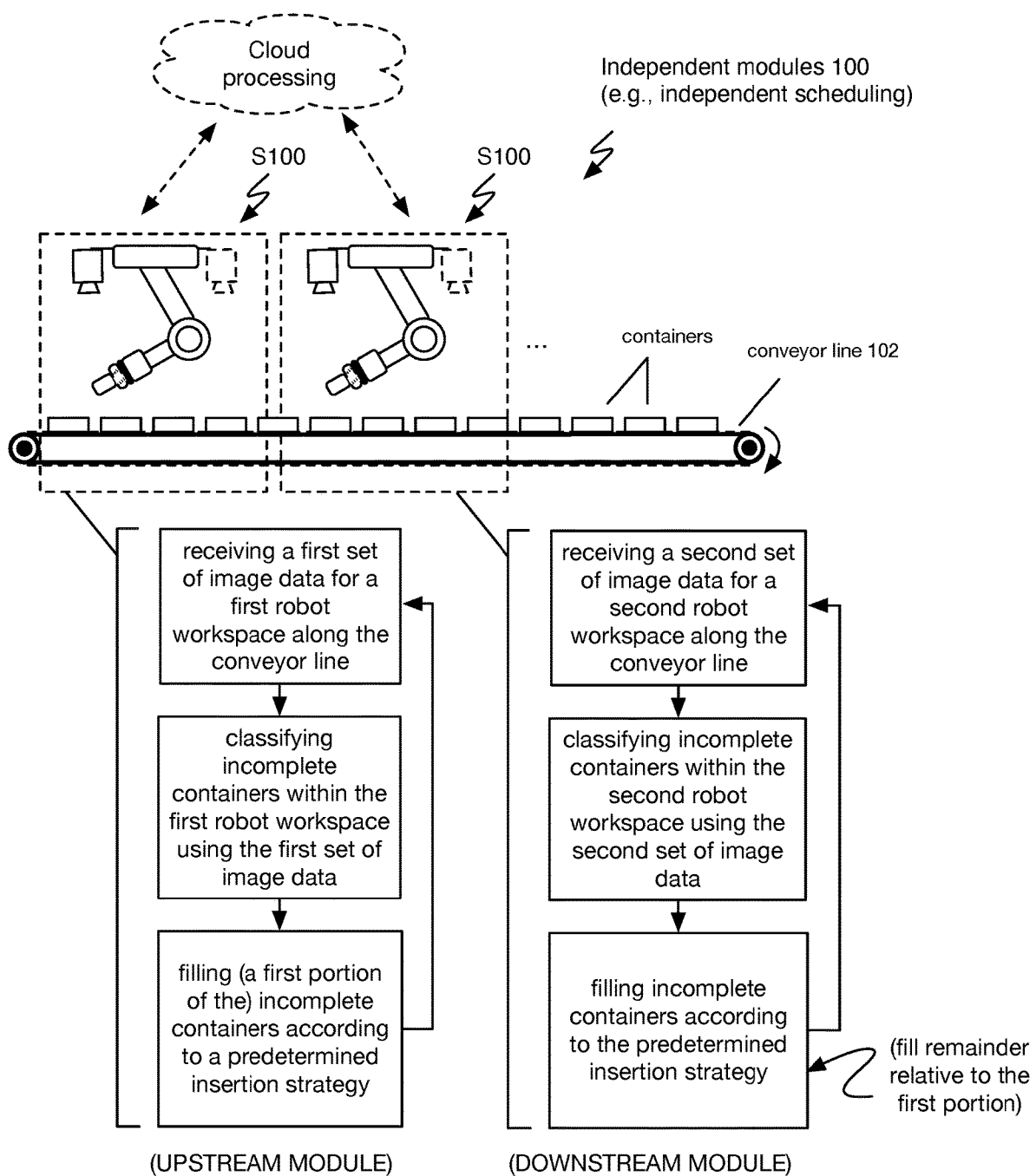
FIG. 9 is an example diagrammatic representation of a variant of the system and/or method.

Additionally or alternatively, in variants with a plurality of foodstuff assembly modules, the scheduling modules of each foodstuff assembly system of the plurality can be communicatively decoupled and configured to operate independently. In a first set of variants, the scheduling module can operate according to a predetermined insertion strategy which is independent of a relative arrangement of the foodstuff assembly system along the assembly line. In a first example, the plurality of foodstuff assembly systems can include an upstream foodstuff assembly system relative to a direction of conveyor line (e.g., an example is shown in FIG. 9), the scheduling module of the upstream foodstuff assembly system can select alternating containers which satisfy a predetermined classification probability for ingredient insertion. In a second example, the set of control instructions for a first foodstuff assembly robot are determined independently from a second set of control instructions for an adjacent foodstuff assembly robot arranged along the conveyor line. In a third example, the plurality of foodstuff assembly systems can include an upstream foodstuff assembly system relative to a direction of conveyor line, wherein the scheduling module of the upstream foodstuff assembly system selects alternating containers which satisfy a predetermined classification probability for ingredient insertion. At a downstream foodstuff assembly system relative to the direction of the conveyor line, a subset of the identified containers contain the foodstuff ingredient, wherein the container classification of each identified container distinguishes the subset of identified containers distinguishes from a remainder of the set, wherein the target(s) is dynamically selected from the remainder.

The system 100 can optionally include or be used with a controller 130 which functions to generate control instructions for insertion at a selected (target) container based on the associated trajectory and/or executes control of a robotic assembly system. The controller can include a pick planner, insert planner, a motion planner, and/or any other suitable planning/control modules. The control module can optionally include a pick planner, which functions to determine a pick location(s) from which to pick ingredients (e.g., from an ingredient container/bin, such as a hotel pan). The control module can optionally include an insert planner, which functions to select a target insertion location for a scheduled container (e.g., based on the trajectory). Alternatively, the target can be selected at a predetermined position/target relative to the container (e.g., as part of the machine configuration), such as a centroid or other point relative to the pose of the container. The control module can optionally include a motion planner, which functions to determine control instructions for the robot arm to: execute a pick attempt for a pick location, transform the arm between the pick location and the target insertion location, and/or execute an (ingredient) insertion at the target insertion location. The motion planner can employ any suitable control scheme (e.g., feedforward control, feedback control, etc.). The control instructions can include a trajectory for a robotic arm in joint (or cartesian) coordinate space, and/or can include any other suitable control instructions (e.g., CNC waypoints, etc.).

In variants, the controller can be a controller of a robotic assembly module as described in U.S. application Ser. No. 17/881,475, titled "SYSTEM AND/OR METHOD FOR ROBOTIC FOODSTUFF ASSEMBLY," filed 4 Aug. 2022, which is incorporated herein in its entirety by this reference.

In variants, the controller can be communicatively coupled to the (foodstuff assembly) robot and configured to control insertion of the foodstuff ingredient within each selected container based on a respective container pose estimate of the selected container.

However, the system 100 can include or be used with any other suitable controller; or, alternatively, the system can otherwise exclude a controller (e.g., where the system instructs a line operator which containers to place ingredients into, etc.) and/or can be otherwise configured.

The system 100 can be local to the robot, remote from the robot, centralized, decentralized, or otherwise configured. In variants, S100 can be entirely performed at a robotic assembly module; or, alternatively, a portion of S100 elements can be executed at a local processor of a robotic assembly module and a remainder can be executed at a remote server and/or cloud processor. As an example, processing can occur independently and/or entirely in parallel between a plurality of modular systems, examples of which are shown in FIG. 5 and FIG. 9. However, processing elements can be otherwise suitably distributed between system endpoints and/or processing nodes.

One or more data processing modules of the system can optionally be configured to generate a set of auxiliary features based on the set of object trajectories, which can serve as an input to the scheduling module for container classification and/or scheduling. In variants, the tracking module can generate auxiliary features based on the set of object trajectories, which can include: proximity parameters (e.g., spacing between nearest adjacent objects, average spacing, etc.), object movement parameters (e.g., rotation of central axis, orientation changes, parameters of motion relative to other containers), aggregate classification parameters (e.g., associated with particular object classifications), and/or any other suitable parameters. Additionally or alternatively, the object detector can generate auxiliary features (e.g., based on detection features) and/or the controller can generate auxiliary features, such as: cycle time parameters, pick plan parameters (e.g., current pick will require an additional time, etc.), insert plan parameters, and/or any other additional parameters. Alternatively, the system can operate without generation of auxiliary parameters, and/or can be otherwise configured.

However, the system can include any other suitable components.

4. Method.

The method S100, an example of which is shown in FIG. 1, can include: receiving imaging data S110; identifying containers using an object detector S120; scheduling insertion based on the identified containers S130; and optionally performing an action based on a scheduled insertion S140. However, the method S100 can additionally or alternatively include any other suitable elements. The method functions to schedule insertion for a robotic system (e.g., a robotic foodstuff assembly module). Additionally or alternatively, the method can function to facilitate execution of a dynamic insertion strategy; and/or facilitate independent (and contemporaneous) operation of a plurality of robotic assembly modules along a conveyor line S100. The method and/or sub-elements thereof can be performed once, repeatedly, iteratively, periodically (e.g., with a specified update interval/frequency), aperiodically, continuously (e.g., over a discrete time interval, substantially continuously based on a data collection rate or frame rate, etc.), and/or with any other suitable timing. Sub-elements can occur sequentially/serially (e.g., for a single iteration of the method) and/or contemporaneously, simultaneously, and/or concurrently (e.g., across multiple iterations of the method and/or elements thereof), and/or with any other suitable timing or relationship.

Receiving imaging data S110 functions to provide an input which can be used for object identification and/or classification by an object detector (in accordance with Block S120). Imaging data is preferably generated and/or received periodically in accordance with a predetermined frame rate (e.g., less than 3 FPS, 3 FPS, 5 FPS, 10 FPS, 20 FPS, 30 FPS, greater than 30 FPS, any open or closed range bounded by the aforementioned values, etc.), and/or update frequency, but can alternatively be received with any other suitable timing/frequency. Imaging data is preferably received from an imaging system, such as an imaging system mounted to a robotic assembly module housing the system, but can alternatively be received from a set of remote/external sensors and/or any suitable set of endpoint(s). Imaging data can include: an RGB image, a depth image, a 3D image, a point cloud, and/or any other suitable imaging data. Imaging data can optionally be pre-processed based on a sensor calibration (e.g., bundle adjusted based on sensor pose, cropped to remove image regions beyond conveyor workspace, etc.), converted into standardized coordinate frame (e.g., conveyor workspace of a robotic assembly module, etc.), transformed into a uniform pixel-to-distance image, and/or can be otherwise suitably pre-formatted or, alternatively, not be pre-formatted.

The images sampled in S110 include or span a conveyor region (e.g., with a field of view of the sensor(s) used to collect the images directed towards the conveyor and/or a region thereof). For example, a conveyor region can be within a workspace of a robotic assembly module and/or a robot arm thereof, wherein the robotic assembly module is configured to insert ingredients into containers occupying the conveyor region of the conveyor line. As a second example, the conveyor region can be a region/portion of a conveyor line which is observable within the images collected during S110.

In one set of variants, images can be pre-processed and/or transformed to yield a uniform pixel-to-distance relationship during S110, such that the dimension(s) of each pixel uniformly and repeatably map to a static physical space/offset (e.g., on a conveyor plane/surface). For example, image homography can be used to convert the image(s) sampled in S110 to a uniform pixel space, in which each pixel offset corresponds to the same static space offset and/or physical distance in the scene, such as along a length of the conveyor in a conveyor plane. The uniform pixel space (e.g., pixel mapping space) can be determined based on a prior conveyor registration, 3D conveyor mapping, and/or otherwise determined. In a first variant, the sampled images can be transformed based on a predetermined conveyor pose and/or conveyor registration (e.g., a conveyor plane in an established coordinate frame). For example, a static/fixed transformation can be applied to each sampled image based on the (registered) pose of the sensor relative to the conveyor. In a second variant, the sampled images can be transformed based on 3D detections for a current frame. However, sampled images can be pre-processed with any other suitable image transformations to achieve a uniform pixel-to-distance relationship within the image frame, such as based on a lens correction, sensor calibration, sensor/conveyor pose estimation, frame/pixel depth estimation, and/or any other suitable information.

The images sampled in S110 are preferably timestamped and/or time-correlated, which may allow for container speed estimation and/or object (container) tracking as a function of time (e.g., across a plurality of historical image frames). However, images can be otherwise collected and/or can include or be associated with any other suitable data.

S110 can be performed in-situ with a robotic foodstuff assembly module (e.g., registered pose/arrangement relative to a conveyor line and/or in a particular machine configuration). Additionally, sensor data collected in S110 can include any other suitable sensor data from a robot assembly module sensor suite. Additionally or alternatively, S110 can be performed by a separate/external system and/or using any other suitable imaging sensors/systems.

However, imaging data can be otherwise suitably received and/or any other suitable sensor data can be used to facilitate other portions of the method.

Identifying containers using an object detector S120 functions to identify containers which can be used for insertion scheduling in accordance with Block S130. In variants, S120 can include: determining a container pose estimate, determining a container classification, and/or any other suitable elements.

The containers are preferably identified from an individual image frame of the imaging data received in S110, but can alternatively be generated from multiple images (e.g., a combination of images captured within a single timestep, etc.) and/or multiple frames of imaging data. The containers are preferably identified using an object detector of a classification module which detects unique object (container) instances from the imaging data, but can be otherwise suitably identified.

Determining a container pose estimate functions to determine a pose of the container in a sensor coordinate frame and/or robot coordinate frame based on the input images. The container pose estimate can be a 2D pose estimate, 2.5D pose estimate (e.g., under an assumption of planarity), 3D pose estimate, and/or any other suitable pose estimate. The pose estimate can include: a bounding box (e.g., defined from max/min positions for a set of orthogonal axes; axis aligned, not axis aligned, etc.), corner points, primary container axis, central point (e.g., center point of a circular bowl, centroid, etc.), and/or any other suitable pose estimate. The container pose estimate is preferably determined as an object pose estimate output of the object detector (e.g., an example is shown in FIG. 3), but can be otherwise suitably determined.

In variants, containers can be individually identified with an object instance identifier (e.g., an instance ID) and/or instance label (e.g., which can be associated with the container pose estimate and/or object tracking across frames). For example, S120 can include determining an instance ID for a container(s) within the robot workspace. In a second example, containers can be independently identified (and tracked) by a plurality of foodstuff assembly modules (and/or via parallel instances of the method, executing in parallel; an example is shown in FIG. 9), wherein containers are identified/tracked by a respective instance IDs which are specific/unique to each foodstuff assembly module. Additionally or alternatively, instance IDs can be globally unique, locally unique, specific to a particular foodstuff assembly module, instance IDs can be otherwise implemented, and/or objects can be otherwise suitably labeled/identified.

Determining a container classification functions to classify a completeness state of a container and/or determine whether an ingredient (e.g., for which a robot is currently configured; corresponding to the machine configuration) exists within an identified container. The container classification is preferably determined using an object classifier (a.k.a. classification model). In a first variant, the classification model can be integrated into the object detector (e.g., the classification can be determined based on the features generated for a particular image frame) or separate from the object detector (e.g., implemented as a cascade of neural networks, an ensemble of neural networks, a compositional network, etc.). The object classification can be a binary classification, multi-class classification, a semantic classification, and/or any other suitable classification. In some variants, the object classifier can generate a classification based on a machine configuration (e.g., stored within data storage, configured by a machine operator during servicing and/or ingredient configuration; where the object classifier is trained to classify ingredients of a plurality of recipes or ingredient configurations), and can be pretrained to classify a plurality of ingredients. Alternatively, the object classifier can be ingredient and/or recipe specific, where the object classifier is pretrained to determine if a particular ingredient (e.g., rice) exists within an identified container (or, similarly, whether an identified object is an empty container or a container with rice).

Determining the container classification preferably includes generating a classification probability (e.g., using the object classifier) for a particular image frame. As an example, a container can be tracked across a series of multiple frames (e.g., using the tracking module and/or an object tracker) and a classification can be determined by aggregating the classification probability across the multiple frames. Alternatively, a single classification can be determined for a container/object (e.g., without aggregation), and/or the container can be otherwise suitably classified.

S120 can optionally include outputting and/or storing an object estimate for the identified container (e.g., which may be used for container tracking, scheduling, and/or control). The object estimate can include: an instance ID (e.g., a container index or other identifier), the container pose estimate, the container classification (e.g., container classification probability), and/or any other suitable information.

However, containers can be otherwise suitably identified.

Scheduling insertion based on the identified containers S130 functions to select containers to target for insertion (e.g., via a controller and/or insertion planner). In variants, S130 can include: optionally determining a container trajectory, optionally determining auxiliary features; selecting a container for ingredient insertion.

Figure 10:
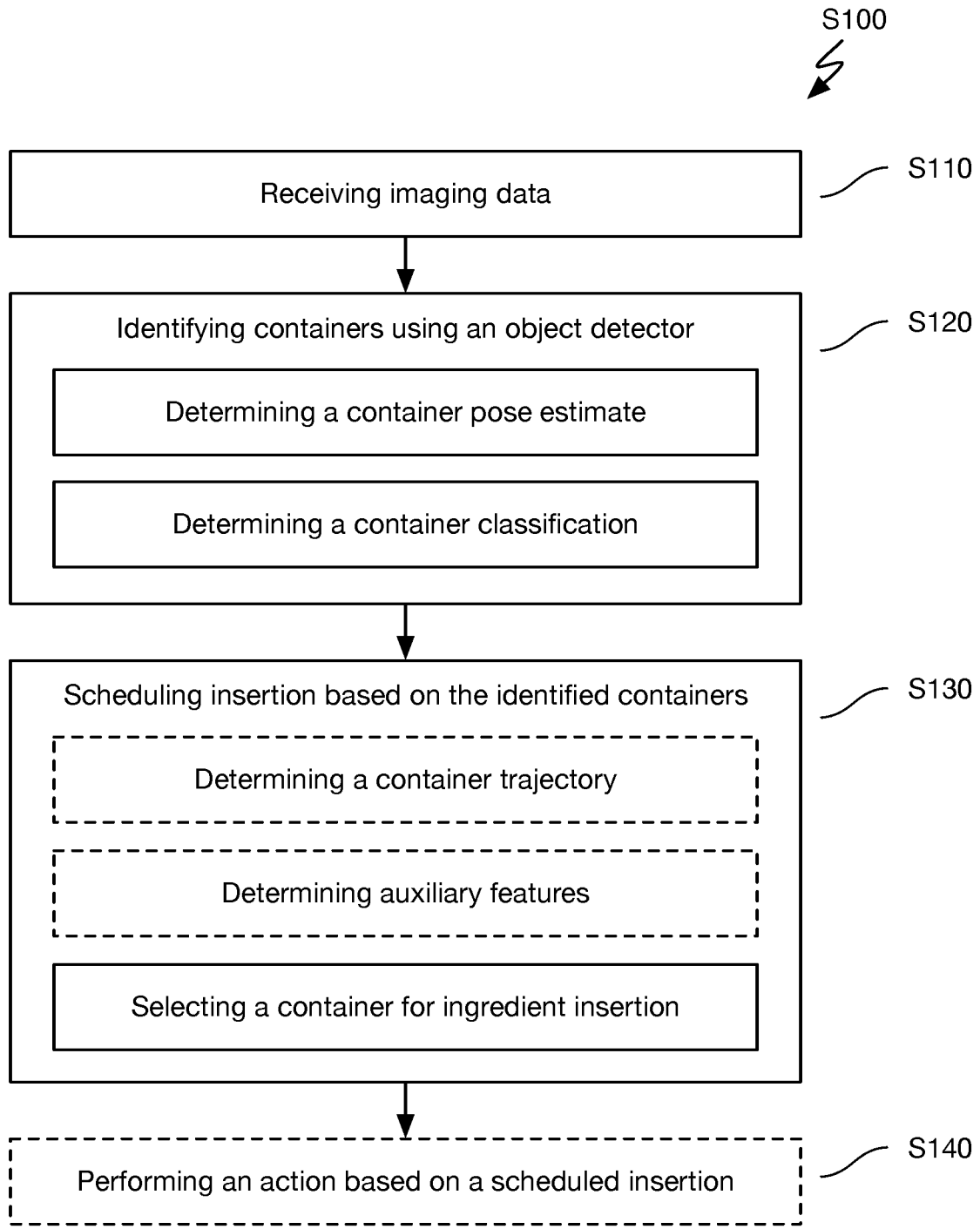
FIG. 10 is a flowchart diagrammatic representation of a variant of the method.

S130 can optionally include determining a container trajectory (e.g., an example is shown in FIG. 10) which functions to predict the motion of the container and/or provide a history of the container motion along a conveyor line. The container trajectory is preferably generated using the tracking module, which generates a container trajectory by tracking an object across a plurality of frames with the corresponding object estimates (e.g., generated in S120). In variants, the container trajectory can be used as an input for insertion scheduling and/or selecting a container for insertion; or, alternatively, containers can be selected for insertion based on an individual container state (e.g., without tracking the container) and/or without the use of a container trajectory (e.g., relying upon a separate line speed determination, for example). However, the container trajectory can be otherwise suitably determined or otherwise not included in S130.

For example, scheduling insertion S130 can include or operate in conjunction with container tracking and/or trajectory estimation, which can facilitate scheduling based on predicted motions of containers and estimated container poses (e.g., during frames in which containers may be occluded).

S130 can optionally include determining auxiliary features, which can be used as inputs for insertion scheduling and/or container selection. Auxiliary features can be: extracted from image features (e.g., at an object detector), generated by a comparison of a plurality of container trajectories, extracted from object estimates, generated based on a pick plan, generated based on prior control instructions, and/or otherwise determined. Auxiliary features can include: image features/parameters (e.g., extracted from an image frame using an object detector), trajectory comparison parameters, proximity parameters (e.g., spacing between nearest adjacent objects, average spacing, etc.), object movement parameters (e.g., rotation of central axis, orientation changes, parameters of motion relative to other containers), aggregate classification parameters (e.g., associated with particular object classifications), insertion cycle time parameters (e.g., based on a control history for a robot), pick plan parameters (e.g., current pick will require an additional time, etc.), insert plan parameters (e.g., estimated time to insert, path length parameter, etc.), and/or any other additional parameters. Auxiliary features can be determined using any one or more of: a detection module, a tracking module, a controller, and/or any other suitable data processing modules. However, auxiliary features can be otherwise suitably determined; or, alternatively, the system can operate without generation of auxiliary parameters, and/or can be otherwise configured.

S130 can include selecting a container for ingredient insertion, which functions to select identified containers (e.g., ID, point/pose thereof, and/or trajectory) to target for insertion planning and control. As an example, a scheduling module can provide the object trajectories received from the tracking module to a controller (e.g., for insertion/motion planning), while masking/filtering out any containers to be skipped (i.e., only providing the information associated with containers selected for ingredient insertion). Additionally or alternatively, selecting a container can function to generate an ingredient insertion schedule which can be used to facilitate actions in accordance with Block S140.

Containers are preferably scheduled for insertion based on the container classification (i.e., whether the ingredient configured for the robot is absent from the container). As an example, in some variants a container will not be selected (or will be skipped) if it is classified as "complete" and/or the ingredient for which the robot is configured is already present in the container. Of the remaining containers (e.g., classified as "incomplete"), containers can be dynamically selected for insertion based on the auxiliary features, container trajectory, container state, and/or any other suitable information (e.g., an example is shown in FIG. 4) as selection inputs. With these selection inputs, containers can be selected using any one or more of: scheduling models, (e.g., a binary classification model; a heuristic classifier), decision trees, neural networks, graphical models, regression models, clustering algorithms, gradient boosting, energy maximization functions, cost functions, heuristics, and/or any other suitable algorithm(s), model(s) or techniques. For example, each "incomplete" container can be scored based on the container trajectory according to a set of predetermined heuristics, and the highest score can be selected for insertion. In a preferred variant, a classification model (e.g., heuristic classifier) can classify incomplete containers for insertion (e.g., in the form of an ordered sequence of object trajectories and/or object identifiers associated with an object trajectory) based on the selection inputs. For example, S130 can label identified containers as a target or a nontarget.

However, containers can otherwise be selected for ingredient insertion.

In a first example, every Nth container can be selected for filling, wherein the system tracks the number of skipped containers since the last filled container. In an illustrative example, this can include incrementing a count of unfilled containers that have passed the system, wherein the system fills the next unfilled container when the count reaches a predetermined value (e.g., N-1), and resets the count after filling the next unfilled container. In a second example, a container can be selected based on the end effector state. For example, a container can be selected when a successful pick is available, or when the end effector is in a predetermined pose relative to the workspace. In a third example, a container can be selected when the probability of insertion success exceeds a threshold value. In a fourth example, the container can be selected based on a set of heuristics or rules (e.g., user-determined heuristics). However, the container can be otherwise selected.

S130 preferably selects containers for insertion using a scheduling model which implements and/or operates according to an insertion strategy and/or objective function. For example, the insertion strategy can be predetermined, received (and/or manually provided by a user) as part of a machine configuration, and/or otherwise implemented. As an example, the insertion strategy can implement a predetermined set of rules such as: a classification probability threshold (e.g., wherein the predetermined set of rules directs selection of containers which satisfy a container classification probability threshold), a minimum gap between adjacent selected containers (e.g., at least one container width), a maximum number of adjacent selected containers (e.g., independent of container classification), collision avoidance criteria, foodstuff availability optimizations (e.g., wherein the predetermined insertion strategy is based on a resource availability of the foodstuff ingredient within the foodstuff assembly system), and/or any other suitable rules/constraints. For example, the predetermined set of rules can direct selection of alternating containers which satisfy a container classification probability threshold. As a second example (e.g., when the method is repeatedly executed), the targets can be dynamically selected based on satisfaction of a classification probability threshold associated with a container classification and at least a subset of the containers with container classifications which satisfy the classification probability threshold are skipped based on the predetermined set of rules.

In variant, scheduling can dynamically adjust and/or optimize an insertion frequency based on: auxiliary features, historical tracking/scheduling (e.g., for observable containers and/or tracked containers; based on a recent tracking history; prior insertion targets, etc.), planned scheduling (e.g., a current insertion target, etc.), supplemental information (e.g., remaining foodstuff estimate, etc.), classification probability, an estimated line speed, an estimated container trajectory, and/or any other suitable information/inputs. S130 can select a single target and/or target container (e.g., for an immediate insertion cycle) and/or multiple insertion targets (e.g., for a multi-insertion strategy; scheduling next N targets; etc.).

However, insertion can be otherwise suitably scheduled.

Optionally performing an action based on the scheduled insertion S140 preferably functions to facilitate insertion of ingredients using a robot (e.g., a robotic assembly module) based on the schedule and/or containers selected for insertion. As an example, S140 can include controlling a robot to fill containers with ingredients in accordance with a machine configuration of the robot and the scheduled insertion. As an example, S140 can include providing object information associated with the selected container (e.g., pose, trajectory, classification, ID/index, etc.) to a controller of the robot, and/or determining control instructions for the robot based on the object information associated with the container (e.g., at a controller of the system 100). Alternatively, actions can include: generating utilization feedback, determining a remaining time to container refill, determining auxiliary features (e.g., a cycle time, a utilization parameter, etc.), and/or any other suitable actions.

Figure 7:
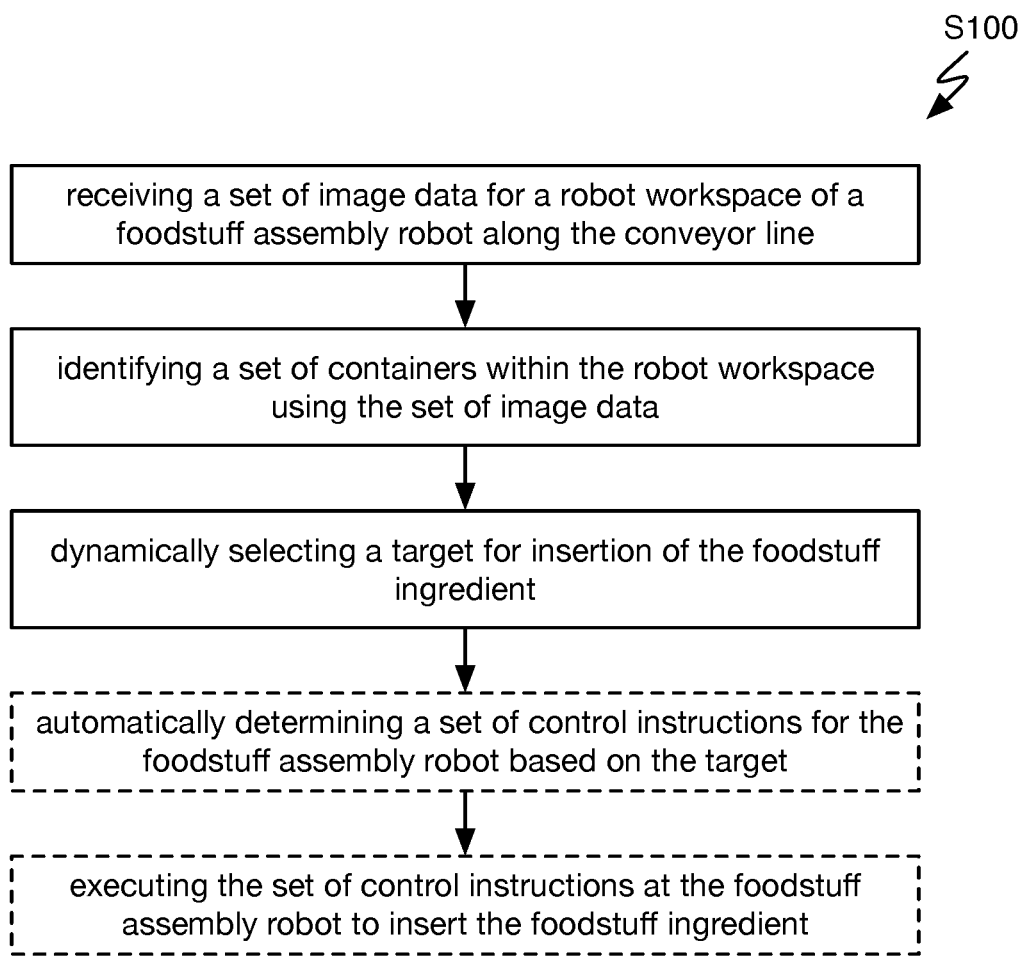
FIG. 7 is an example flowchart diagrammatic representation of a variant of the method.

In variant, an example is shown in FIG. 7, S140 can include automatically determining (e.g., at a controller) a set of control instructions for the foodstuff assembly robot based on the target and/or executing the set of control instructions at the foodstuff assembly robot to insert the foodstuff ingredient.

As an example, S140 can include controlling a foodstuff assembly robot as described in U.S. application Ser. No. 17/881,484, filed 4 Aug. 2022, which is incorporated herein in its entirety by this reference.

However, a scheduled insertion can facilitate any other suitable actions and/or can be otherwise suitably utilized.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A system for insertion of a foodstuff ingredient along a conveyor line, comprising:
a plurality of foodstuff assembly systems arranged in series along the conveyor line, each comprising:
a robot configured to manipulate the foodstuff ingredient;
a set of sensors configured to sample images of the conveyor line;
a computing system, comprising:
a perception module configured to, with images sampled by the set of sensors:
identify containers along the conveyor line;
estimate a container pose for each identified container; and
with a classification model, determine a classification probability associated with presence of the foodstuff ingredient within each identified container;
a scheduling module system configured to select containers for ingredient insertion based on the classification probabilities of the identified containers; and
a controller, communicatively coupled to the robot, which is configured to control insertion of the foodstuff ingredient within each selected container based on a respective container pose estimate of the selected container,
wherein the scheduling modules of each foodstuff assembly system of the plurality are communicatively decoupled and configured to operate independently, wherein the scheduling module of each foodstuff assembly system operates according to a predetermined insertion strategy which is independent of a relative arrangement of the foodstuff assembly system along the assembly line, wherein the plurality of foodstuff assembly systems comprises an upstream foodstuff assembly system relative to a direction of conveyor line, wherein the scheduling module of the upstream foodstuff assembly system selects alternating containers which satisfy a predetermined classification probability for ingredient insertion.

2. The system of claim 1, wherein the predetermined insertion strategy is based on a conveyor line speed.

3. The system of claim 1, wherein each foodstuff assembly system defines an ingredient insertion rate, wherein a container throughput rate of the conveyor line is greater than the ingredient insertion rate.

4. A method for dynamic insertion of a foodstuff ingredient along a conveyor line, comprising:
receiving a set of image data for a robot workspace of a foodstuff assembly robot along the conveyor line;
with an object detector, identifying a set of containers within the robot workspace using the set of image data, comprising, for each container of the set:
determining a container pose estimate; and
based on the foodstuff ingredient, determining a container classification comprising a binary classification;
based on the container pose estimates and the container classifications of each container of the set, dynamically selecting a target for insertion of the foodstuff ingredient;
automatically determining a set of control instructions for the foodstuff assembly robot based on the target; and
executing the set of control instructions at the foodstuff assembly robot to insert the foodstuff ingredient.

5. The method of claim 4, wherein the target is dynamically selected according to a predetermined set of rules.

6. The method of claim 5, wherein the predetermined set of rules directs selection of alternating containers which satisfy a container classification threshold.

7. The method of claim 5, wherein the method is repeatedly executed, wherein the targets are dynamically selected based on satisfaction of a classification probability threshold associated with a container classification, wherein at least a subset of the containers with container classifications which satisfy the classification probability threshold are skipped based on the predetermined set of rules.

8. The method of claim 4, wherein the target is dynamically selected according to a predetermined insertion strategy or an objective function.

9. The method of claim 4, wherein the set of control instructions for the foodstuff assembly robot are determined independently from a second set of control instructions for an adjacent foodstuff assembly robot arranged along the conveyor line.

10. The method of claim 9, wherein the adjacent foodstuff assembly robot is configured to insert the foodstuff ingredient upstream of the robot workspace, wherein the adjacent foodstuff assembly robot is operated independently of the foodstuff assembly robot.

11. The method of claim 4, wherein a subset of the identified containers contain the foodstuff ingredient, wherein the container classification of each identified container distinguishes the subset of identified containers from a remainder of the set, wherein the target is dynamically selected from the remainder.

12. The method of claim 11, wherein the robot workspace is downstream of a human assembly workspace along the conveyor line.

13. The method of claim 4, wherein the object detector is pretrained to determine the container classification based on the foodstuff ingredient.

14. The method of claim 4, wherein the object detector comprises a joint detection-classification-model which is pre-trained based on the foodstuff ingredient.

15. The method of claim 14, wherein the object detector is pretrained based further on an assembly context associated with a foodstuff container appearance.

16. The method of claim 4, wherein the container classification comprises a binary classification probability.

17. The method of claim 5, wherein the set of image data comprises a plurality of historical image frames, wherein the method further comprises, based on the plurality of historical frames:
    tracking a trajectory of an identified container; and
    estimating a speed of the conveyor,
wherein the target is dynamically selected based on the speed of the conveyor and the trajectory of the identified container.

18. The method of claim 17, wherein the target corresponds to a first container which is occluded in at least one of the plurality of historical image frames.

19. A method for dynamic insertion of a foodstuff ingredient along a conveyor line, comprising:
    receiving a set of image data for a robot workspace of a foodstuff assembly robot along the conveyor line, wherein the set of image data comprises a plurality of historical image frames,
    based on the plurality of historical frames:
        tracking a trajectory of an identified container; and
        estimating a speed of the conveyor;
    with an object detector, identifying a set of containers within the robot workspace using the set of image data, comprising, for each container of the set:
        determining a container pose estimate; and
        determining a container classification based on the foodstuff ingredient;
    based on the container pose estimates and the container classifications of each container of the set, dynamically selecting a target for insertion of the foodstuff ingredient according to a predetermined set of rules, wherein the target is dynamically selected based on the speed of the conveyor and the trajectory of the identified container;
    automatically determining a set of control instructions for the foodstuff assembly robot based on the target; and
    executing the set of control instructions at the foodstuff assembly robot to insert the foodstuff ingredient,
wherein the target corresponds to a first container which is occluded in at least one of the plurality of historical image frames.

20. A method for dynamic insertion of a foodstuff ingredient along a conveyor line, comprising:
    receiving a set of image data for a robot workspace of a foodstuff assembly robot along the conveyor line;
    with an object detector, identifying a set of containers within the robot workspace using the set of image data, comprising, for each container of the set:
        determining a container pose estimate; and
        determining a container classification based on the foodstuff ingredient;
    based on the container pose estimates and the container classifications of each container of the set, dynamically selecting a target for insertion of the foodstuff ingredient;
    automatically determining a set of control instructions for the foodstuff assembly robot based on the target; and
    executing the set of control instructions at the foodstuff assembly robot to insert the foodstuff ingredient,
wherein a subset of the identified containers contain the foodstuff ingredient, wherein the container classification of each identified container distinguishes the subset of identified containers from a remainder of the set, wherein the target is dynamically selected from the remainder.

* * * * *